United States Patent
Kobayashi et al.

(10) Patent No.: US 9,602,150 B1
(45) Date of Patent: Mar. 21, 2017

(54) WIRELESS DEVICE

(71) Applicant: FUJITSU LIMITED, Kawasaki-shi, Kanagawa (JP)

(72) Inventors: Ryosuke Kobayashi, Kawasaki (JP); Shin Watanabe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/244,332

(22) Filed: Aug. 23, 2016

(30) Foreign Application Priority Data

Sep. 30, 2015 (JP) ................................ 2015-193321

(51) Int. Cl.
*H04L 25/03* (2006.01)
*H04B 1/04* (2006.01)

(52) U.S. Cl.
CPC ... *H04B 1/0475* (2013.01); *H04B 2001/0425* (2013.01)

(58) Field of Classification Search
CPC .......... H04B 1/0475; H04B 2001/0425; H03F 1/3258; H03F 3/245; H03F 3/189; H03F 1/3247; H03F 1/3294; H03F 2201/3233; H03F 2200/336
See application file for complete search history.

(56) References Cited

U.S. PATENT DOCUMENTS

| 2004/0212428 | A1 | 10/2004 | Ode et al. | |
| 2005/0184803 | A1* | 8/2005 | Hirose | H03F 1/3258 330/149 |
| 2005/0226346 | A1* | 10/2005 | Ode | H03F 1/3247 375/296 |
| 2007/0030920 | A1* | 2/2007 | Funyu | H03F 1/3247 375/296 |
| 2007/0200625 | A1* | 8/2007 | Shako | H03F 1/3247 330/149 |
| 2008/0187035 | A1* | 8/2008 | Nakamura | H03F 1/0288 375/232 |
| 2009/0238294 | A1* | 9/2009 | Toyomane | H03F 1/3247 375/260 |

(Continued)

FOREIGN PATENT DOCUMENTS

| JP | 2002-232305 | 8/2002 |
| WO | 02/087097 | 10/2002 |

*Primary Examiner* — Syed Haider
(74) *Attorney, Agent, or Firm* — Fujitsu Patent Center

(57) ABSTRACT

A distortion compensation unit compensates distortion in the amplifier by using a distortion compensation coefficient that is in accordance with a power value of a signal before amplification in the amplifier. An updating unit updates, on the basis of the signal before amplification in the amplifier and a signal after amplification in the amplifier, the distortion compensation coefficient. An extracting unit extracts, at a predetermined number of measurement periods, when the power value of the signal before amplification in the amplifier is equal to or greater than a threshold, the distortion compensation coefficient that is in accordance with the power value. A first calculating unit calculates, by using an average value of the extracted distortion compensation coefficients, an amount of variation in the distortion compensation coefficient. A determination unit determines, on the basis of the calculated amount of variation in the distortion compensation coefficient, whether the amplifier is degraded.

9 Claims, 13 Drawing Sheets

(56) References Cited

U.S. PATENT DOCUMENTS

| | | | |
|---|---|---|---|
| 2010/0164620 A1* | 7/2010 | Hamada | H03F 1/3247 330/149 |
| 2012/0229209 A1* | 9/2012 | Fudaba | H03F 1/3247 330/149 |
| 2014/0003554 A1* | 1/2014 | Matsubara | H04B 1/0475 375/297 |
| 2015/0124904 A1* | 5/2015 | Shizawa | H03F 1/3247 375/297 |

* cited by examiner

FIG.5

| MEASUREMENT TEMPERATURE [°C] | INITIAL VALUE |
|---|---|
| -10 TO 0 | A |
| 1 TO 10 | B |
| 11 TO 20 | C |
| 21 TO 30 | D |
| 31 TO 40 | E |
| 41 TO 50 | F |
| 51 TO 60 | G |
| 61 TO 70 | H |
| 71 TO 80 | I |
| 81 TO 91 | J |
| 91 TO 100 | K |

WIRELESS DEVICE

CROSS-REFERENCE TO RELATED APPLICATION

This application is based upon and claims the benefit of priority of the prior Japanese Patent Application No. 2015-193321, filed on Sep. 30, 2015, the entire contents of which are incorporated herein by reference.

FIELD

The embodiment discussed herein is related to a wireless device.

BACKGROUND

Conventionally, for example, in radio communication devices, such as base station devices or the like, due to aged deterioration of amplifiers in the devices or the like, the gain of the amplifiers may sometimes vary. Furthermore, in recent radio communication devices, studies have been conducted on a system in which a radio equipment control (REC) device that mainly performs a baseband process is connected, by using optical fibers, to radio equipment (RE) devices that mainly perform a radio process. The connection between the REC device and the RE devices is performed in accordance with, for example, an interface called a Common Public Radio Interface (CPRI).

In the radio communication devices, for example, because the gain prescribed by law is expected to be observed, in general, a periodic inspection is performed to determine whether the gain of an amplifier described above is within the range that satisfies the prescription. However, because the base station devices and the RE devices are often arranged at a high place, such as on the roof of a building, on a steel tower, or the like, the efficiency of checking the gain of the amplifiers in these devices by maintenance workers on site is low and the cost is increased.

Thus, studies have been conducted on various kinds of technologies in which a base station device or a RE device itself determines deterioration of an amplifier in the device. For example, it is conceivable to extract, in a device that has a distortion compensation function that compensates nonlinear distortion generated in an amplifier, a distortion compensation coefficient in accordance with a power value of the most frequently appearing radio signal, obtains an amount of variation in the distortion compensation coefficient that was extracted in the past, and determines, on the basis of the obtained amount of variation, the degradation of the amplifier.

Patent Document 1: Japanese Laid-open Patent Publication No. 2002-232305

However, if the degradation of the amplifier is determined by extracting the distortion compensation coefficient that is in accordance with the power value of the most frequently appearing radio signal, the frequency of appearance of the power value of the radio signal varies due to the location of the device that is placed or due to a use time zone of the device and thus the power value of the radio signal may possibly deviate from the nonlinear operation area of the amplifier. Here, when measuring variation of the gain that is used to determine the degradation of the amplifier, for example, it is prescribed by law that the power value of the radio signal needs to be present in a nonlinear operation area of the amplifier, i.e., it is prescribed by law that the power value of the radio signal needs to be equal to or greater than the threshold. Consequently, when the distortion compensation coefficient that is in accordance with the power value of the most frequently appearing radio signal is extracted, because the variation of the gain may possibly be measured by using the distortion compensation coefficient that is in accordance with the power value that does not satisfy the prescription of law, it is difficult to appropriately determine the degradation of the amplifier.

SUMMARY

According to an aspect of an embodiment, a wireless device includes an amplifier that amplifies a signal that is wirelessly transmitted; a distortion compensation unit that compensates distortion in the amplifier by using a distortion compensation coefficient that is stored in a distortion compensation table and that is in accordance with a power value of a signal before amplification in the amplifier; an updating unit that updates, on the basis of an error between the signal before the amplification in the amplifier and a signal after the amplification in the amplifier, the distortion compensation coefficient stored in the distortion compensation table; an extracting unit that extracts, at a predetermined number of measurement periods, from the distortion compensation table when the power value of the signal before the amplification in the amplifier is equal to or greater than a threshold, the distortion compensation coefficient that is in accordance with the power value; a first calculating unit that calculates, by using an average value of distortion compensation coefficients extracted at the predetermined number of measurement periods, an amount of variation in the distortion compensation coefficient with respect to an initial value of the distortion compensation coefficient; and a determination unit that determines, on the basis of the calculated amount of variation in the distortion compensation coefficient, whether the amplifier is degraded.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a schematic diagram illustrating an example of a first association table in which the measurement temperature is associated with an initial value of a distortion compensation coefficient that is in accordance with each of the measurement temperatures;

DESCRIPTION OF EMBODIMENTS

Figure 1:
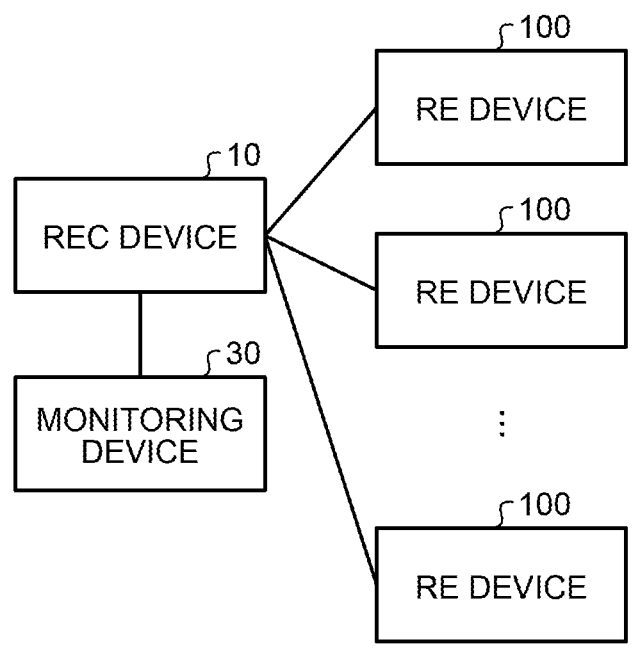
FIG. 1 is a block diagram illustrating the configuration of a radio communication system according to an embodiment.

Preferred embodiments of the present invention will be explained with reference to accompanying drawings. The disclosed technology is not limited to the embodiment. Furthermore, in the embodiment described below, components having the same function are assigned the same reference numerals and descriptions of overlapped portions will be omitted.

FIG. 1 is a block diagram illustrating the configuration of a radio communication system according to an embodiment. The radio communication system illustrated in FIG. 1 includes a REC device 10 and a plurality of RE devices 100 connected to the REC device 10. Furthermore, a monitoring device 30 is connected to the REC device 10. Furthermore, the connection between the REC device 10 and the plurality of the RE devices 100 is performed by conforming to the interface called, for example, a CPRI.

The REC device 10 performs a baseband process on transmission data. For example, the REC device 10 performs the baseband process, such as an encoding process, a modulation process, or the like, on the transmission data and sends the obtained baseband signal to each of the RE devices 100.

The monitoring device 30 monitors the state of the REC device 10 and the RE device 100 and notifies a user whether, for example, a maintenance checkup, such as a replacement of a part, is needed. Specifically, if, for example, an amplifier included in one of the RE devices 100 is degraded, the monitoring device 30 generates an alarm that indicates the subject status.

Each of the RE devices 100 is connected to the REC device 10 via optical fibers and performs a radio process on the transmission data. For example, each of the RE devices 100 performs digital-to-analog (DA) conversion and up-conversion on the baseband signal that is received from the REC device 10 and then sends the obtained radio signal via the antenna.

Figure 2:
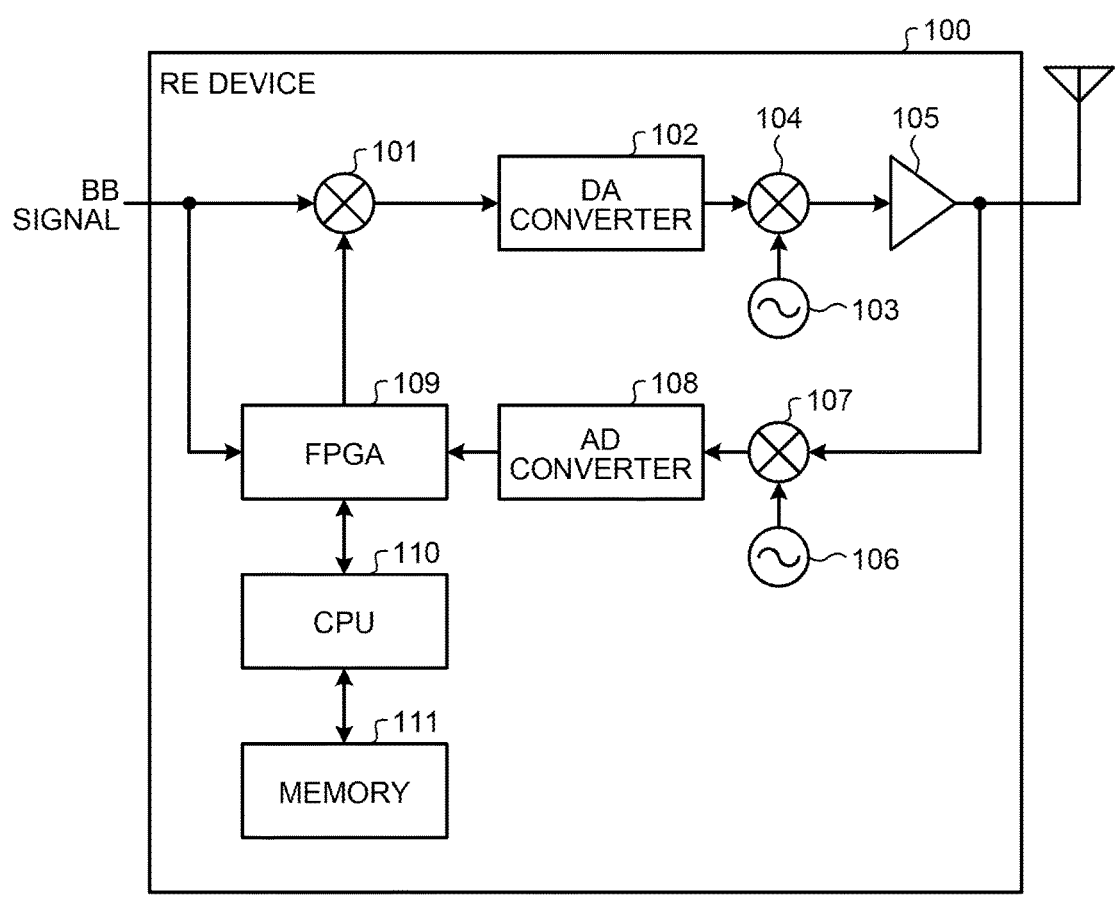
FIG. 2 is a block diagram illustrating the configuration of a RE device according to the embodiment.

FIG. 2 is a block diagram illustrating the configuration of a RE device according to the embodiment. In FIG. 2 mainly illustrates the configuration related to transmission and does not illustrate the configuration related to reception. The RE device 100 illustrated in FIG. 2 includes a multiplier 101, a DA converter 102, an oscillator 103, a modulator 104, a power amplifier (PA) 105, an oscillator 106, a mixer 107, and an AD converter 108. Furthermore, the RE device 100 includes, as a processor, in addition to a field programmable gate array (FPGA) 109 and a central processing unit (CPU) 110, a memory 111.

The multiplier 101 multiplies the distortion compensation coefficient that is output from the FPGA 109 with respect to the baseband signal (hereinafter, referred to as a "BB signal") that is received from the REC device 10 and then performs distortion compensation on the BB signal. Namely, the multiplier 101 functions as a distortion compensation unit. The distortion compensation coefficient is a coefficient that is used to compensate the nonlinear distortion generated in the PA 105. The multiplier 101 outputs, to the DA converter 102, the BB signal that has been subjected to distortion compensation.

The DA converter 102 performs DA conversion on the BB signal that has been subjected to distortion compensation and then outputs the obtained analog BB signal to the modulator 104.

The oscillator 103 generates a local signal with a radio frequency by using a clock of the BB signal.

The modulator 104 up-converts an analog BB signal by using the local signal generated in the oscillator 103.

The PA 105 amplifies the signal that is up-converted by the modulator 104 and sends the up-converted signal to the antenna.

The oscillator 106 generates a local signal with the intermediate frequency by using a clock of the BB signal.

The mixer 107 down-converts a feedback signal (hereinafter, referred to as an "FB signal") that is fed back from the PA 105 by using the local signal generated in the oscillator 106.

The AD converter 108 performs AD conversion on the FB signal that is down-converted by the mixer 107 and then outputs the obtained digital FB signal to the FPGA 109.

The FPGA 109 refers to a look-up table (hereinafter, referred to as a "LUT") that stores therein distortion compensation coefficients and outputs the distortion compensation coefficient that is in accordance with the power value of the BB signal to the multiplier 101. Furthermore, the FPGA 109 updates, on the basis of the FB signal that is output from the AD converter 108, the distortion compensation coefficients stored in the LUT. Furthermore, if the power value of the BB signal is equal to or greater than a threshold, the FPGA 109 extracts, at the measurement time of the predetermined number of measurements from the LUT, the distortion compensation coefficients and calculates, by using the average value of the extracted distortion compensation coefficients, an amount of variation in the distortion compensation coefficient with respect to the initial value. Furthermore, if the power value of the BB signal is equal to or greater than the threshold, the FPGA 109 acquires the frequency spectra of the FB signal at the measurement time of the predetermined number of measurements and then calculates, by using the averaged frequency spectrum, an amount of variation in the bandwidth of the FB signal with respect to the initial value. Here, the BB signal is an example of a signal before amplification in the PA 105 and the FB signal is an example of a signal after amplification in the PA 105. Furthermore, a specific configuration of the FPGA 109 will be described in detail later.

The CPU 110 determines the degradation of the PA 105 on the basis of the amount of variation in the distortion compensation coefficient or on the basis of the amount of variation in the bandwidth of the FB signal calculated by the FPGA 109. For example, if the amount of variation in the distortion compensation coefficient is equal to or greater than the threshold, the CPU 110 determines that the PA 105 is degraded and, if the amount of variation in the distortion compensation coefficient is less than the threshold, the CPU 110 determines that the PA 105 is not degraded.

Furthermore, the CPU 110 notifies the monitoring device 30 via the REC device 10 of the information related to the determination result indicating whether the PA 105 is degraded. At this point, the CPU 110 may also derive a prediction line of the amount of variation on the basis of, for example, the calculated amount of variation in the distortion compensation coefficient and notify the monitoring device 30 of the remaining time before the amount of variation in the distortion compensation coefficient reaches a predetermined threshold.

The memory 111 temporarily stores therein various kinds of information that is used for a process executed by the CPU 110.

Figure 3:
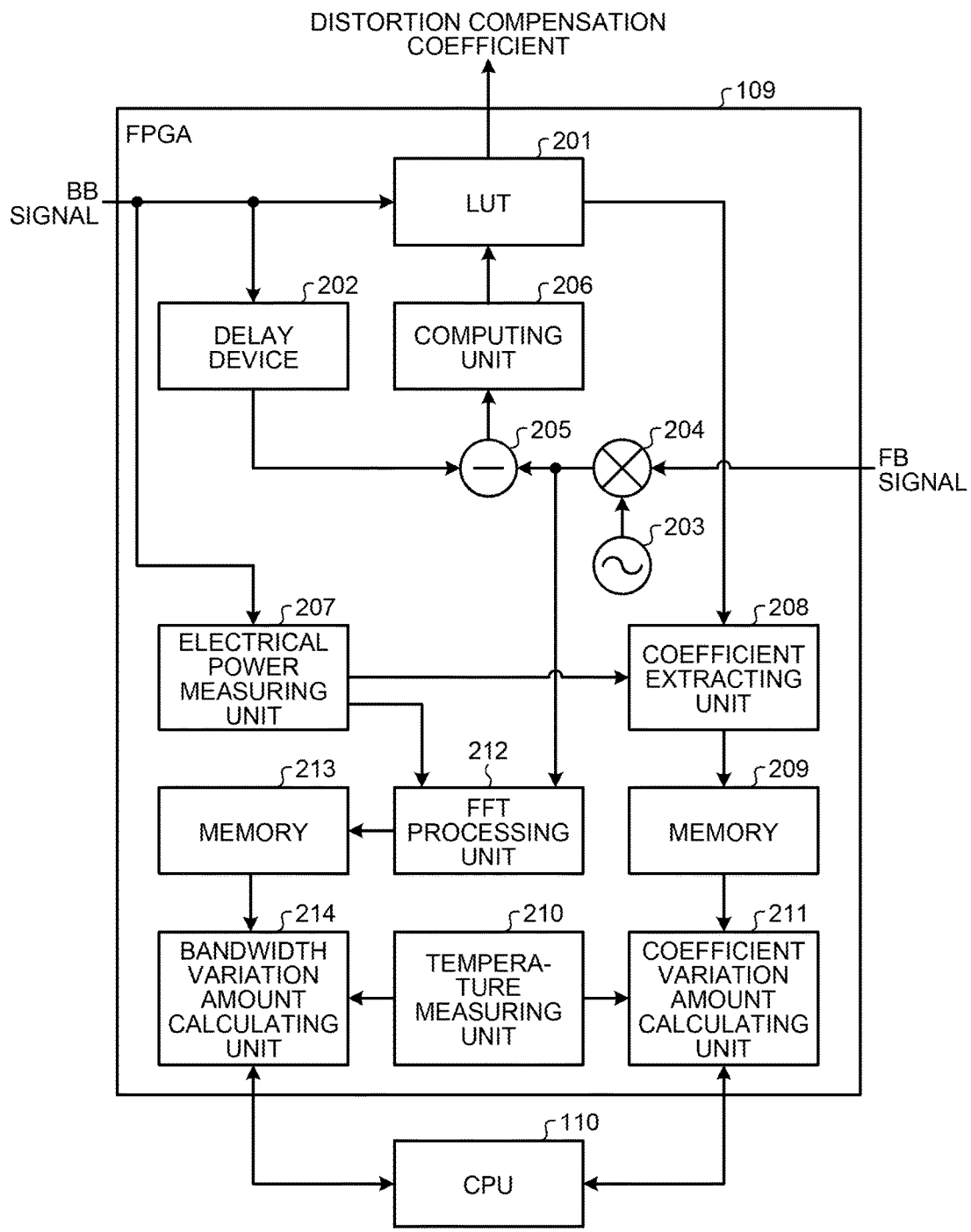
FIG. 3 is a block diagram illustrating the configuration of an FPGA according to the embodiment.

FIG. 3 is a block diagram illustrating the configuration of an FPGA according to the embodiment. The FPGA 109 illustrated in FIG. 3 includes a LUT 201, a delay device 202, an oscillator 203, a mixer 204, a comparator 205, and a computing unit 206. Furthermore, the FPGA 109 includes an electrical power measuring unit 207, a coefficient extracting unit 208, a memory 209, a temperature measuring unit 210, and a coefficient variation amount calculating unit 211. Furthermore, the FPGA 109 includes a fast Fourier transformation (FFT) processing unit 212, a memory 213, and a bandwidth variation amount calculating unit 214.

The LUT 201 stores therein distortion compensation coefficients associated with the power values of the BB signal and outputs, if the BB signal is input to the FPGA 109, the distortion compensation coefficient that is associated with the power value of the input BB signal to the multiplier 101. Namely, the LUT 201 functions as a distortion compensation table.

The delay device 202 makes the BB signal that is input to the FPGA 109 delay and matches the FB signal that is fed back to the FPGA 109 to the phase. Namely, the delay device 202 temporarily holds the BB signal and makes the BB signal delay such that the associated BB signal and FB signal are compared by the comparator 205.

The oscillator 203 generates a local signal with a frequency that is used to remove a carrier component in the FB signal.

The mixer 204 removes a carrier component from the FB signal by using the local signal generated in the oscillator 203. Namely, by removing the carrier component from the FB signal, the mixer 204 extracts the FB signal that can be compared with the BB signal.

The comparator 205 compares the BB signal with the FB signal and outputs an error between both the signals to the computing unit 206.

The computing unit 206 calculates a distortion compensation coefficient that makes the error output from the comparator 205 approach zero and updates the LUT 201 by using the calculated distortion compensation coefficient. Namely, the computing unit 206 functions as an updating unit and updates the distortion compensation coefficients stored in the LUT 201 such that an error between the BB signal and the baseband component of the FB signal becomes zero. Consequently, an accuracy of the distortion compensation coefficients is improved and the nonlinear distortion generated in the PA 105 can be efficiently compensated.

Figure 4:
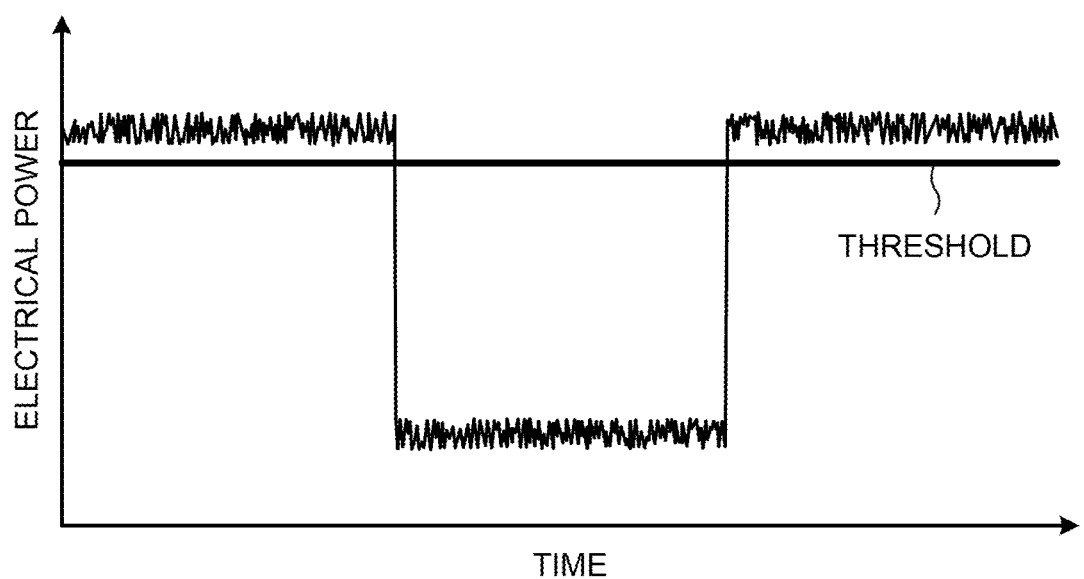
FIG. 4 is a schematic diagram illustrating an example of time fluctuation of a power value of a BB signal.

The electrical power measuring unit 207 measures the power value of the BB signal and outputs the measured power value of the BB signal to both the coefficient extracting unit 208 and the FFT processing unit 212. The power value of the BB signal measured by the electrical power measuring unit 207 varies in accordance with, for example, time, as illustrated in FIG. 4. FIG. 4 is a schematic diagram illustrating an example of time fluctuation of a power value of a BB signal. It is assumed that the threshold illustrated in FIG. 4 is a threshold that divides the area into the nonlinear operation area and the linear operation area of the PA 105. Namely, the power value of the BB signal becomes equal to or greater than the threshold at a certain time; is present in the nonlinear operation area of the PA 105; becomes less than the threshold at another time that is different from the certain time; and is present in the linear operation area of the PA 105. When measuring variation of the gain that is used to determine the degradation of the amplifier, such as the PA 105 or the like, for example, it is prescribed by law that the power value of the radio signal is present in the nonlinear operation area of the amplifier, i.e., it is prescribed by law that the power value of the radio signal is equal to or greater than the "threshold". Namely, if the power value of the BB signal is less than the threshold, the prescription of law is not satisfied.

The coefficient extracting unit 208 monitors the power value of the BB signal measured by the electrical power measuring unit 207 and, if the power value of the BB signal is equal to or greater than the threshold (for example, the threshold illustrated in FIG. 4), the coefficient extracting unit 208 extracts, from the LUT 201 at the measurement time of the predetermined number of measurements, the distortion compensation coefficients that are in accordance with the power value of the BB signal. Then, the coefficient extracting unit 208 outputs, to the memory 209, the distortion compensation coefficients extracted from the LUT 201 at the measurement time of the predetermined number of measurements.

The memory 209 stores therein the distortion compensation coefficients extracted by the coefficient extracting unit 208 from the LUT 201 for each measurement time.

The temperature measuring unit 210 measures the temperature of the RE device 100 and outputs the measured temperature to both the coefficient variation amount calculating unit 211 and the bandwidth variation amount calculating unit 214. In a description below, the temperature that is output from the temperature measuring unit 210 to both the coefficient variation amount calculating unit 211 and the bandwidth variation amount calculating unit 214 is referred to as a "measurement temperature".

The coefficient variation amount calculating unit 211 calculates an amount of variation in the distortion compensation coefficient with respect to the initial value by using the distortion compensation coefficients stored in the memory 209, i.e., by using the average value of the distortion compensation coefficients extracted from the LUT 201 at the measurement time of the predetermined number of measurements. At this point, the coefficient variation amount calculating unit 211 may also change the initial value of the distortion compensation coefficient in accordance with the "measurement temperature" from the temperature measuring unit 210 and calculate an amount of variation in the distortion compensation coefficient of the changed initial value. The amount of variation in the distortion compensation coefficient calculated by the coefficient variation amount calculating unit 211 is output to the CPU 110.

Figure 6:
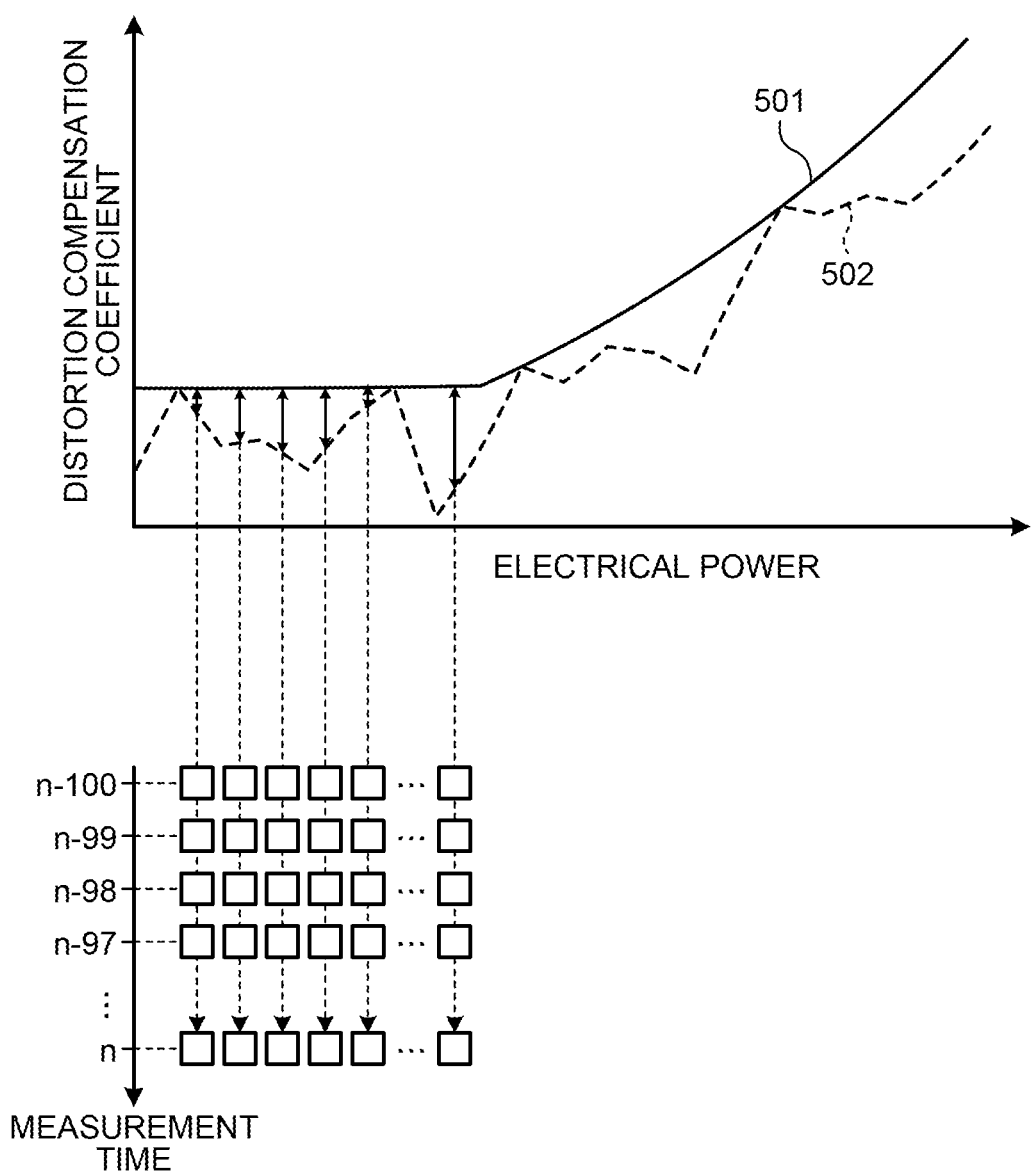
FIG. 6 is a schematic diagram illustrating an example of a calculation process of the average value of distortion compensation coefficients extracted from an LUT at the measurement time of a predetermined number of measurements.
Figure 7:
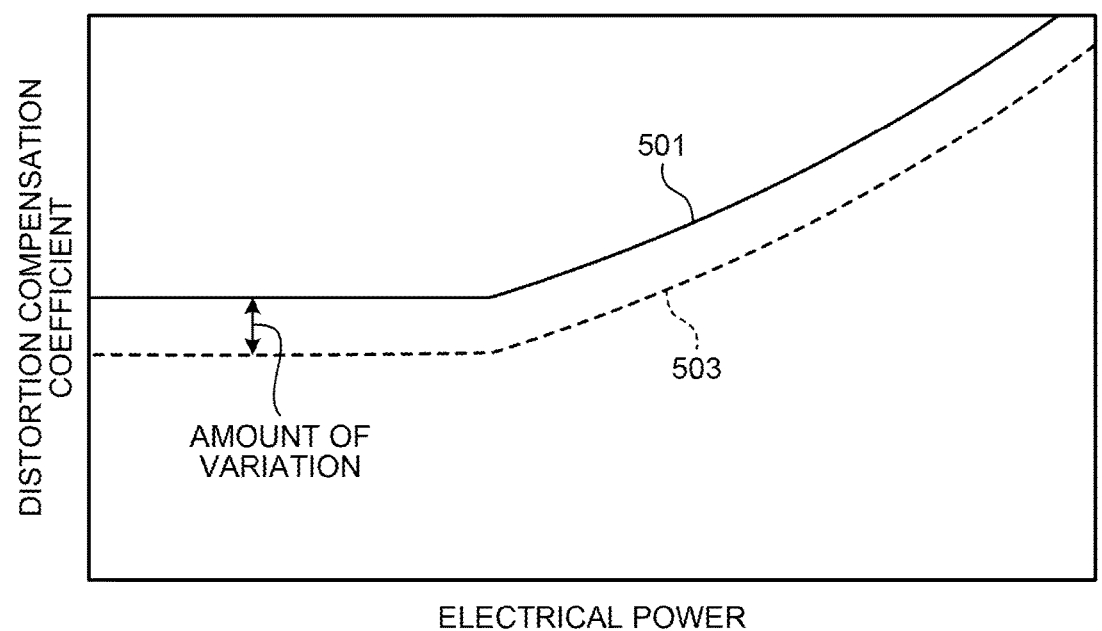
FIG. 7 is a schematic diagram illustrating an example of a calculation process of an amount of variation in distortion compensation coefficients.

In the following, an example of the process performed by the coefficient variation amount calculating unit 211 will be described with reference to FIGS. 5 to 7. FIG. 5 is a schematic diagram illustrating an example of a first association table in which the measurement temperature is associated with an initial value of a distortion compensation coefficient that is in accordance with each of the measurement temperatures. FIG. 6 is a schematic diagram illustrating an example of a calculation process of the average value of the distortion compensation coefficients extracted from an LUT at the measurement time of the predetermined number of measurements. Furthermore, in FIG. 6, a solid line 501 indicates the initial value of each of the distortion compensation coefficients that are in accordance with a certain measurement temperature and a broken line 502 indicates the distortion compensation coefficients stored in the memory 209, i.e., the distortion compensation coefficients extracted from the LUT 201 at the measurement time of the predetermined number of measurements. FIG. 7 is a schematic diagram illustrating an example of a calculation process of an amount of variation in each of the distortion compensation coefficients.

For example, the coefficient variation amount calculating unit 211 holds the first association table illustrated in FIG. 5 and acquires, by using the first association table, the initial value of the distortion compensation coefficient that is associated with the "measurement temperature" measured by the temperature measuring unit 210. The initial value of the distortion compensation coefficient is a value that is previously determined when, for example, the RE device 100 is shipped from a plant or the like. Furthermore, the coefficient variation amount calculating unit 211 refers to the memory 209 and performs, as illustrated in FIG. 6, a moving average process on the distortion compensation coefficients extracted from the LUT 201 at the measurement time of the predetermined number of measurements, whereby the coefficient variation amount calculating unit 211 calculates the average value of the distortion compensation coefficients. In the example illustrated in FIG. 6, the average value of the distortion compensation coefficients extracted from the LUT 201 at the measurement time of 100 measurements. Then, the coefficient variation amount calculating unit 211 calculates, as illustrated in FIG. 7, a difference between the initial value of each of the distortion compensation coefficients acquired from the first association table, the initial value being indicated by the solid line 501, and an average value of the distortion compensation coefficients, the average value being indicated by a broken line 503 as the amount of variation in the distortion compensation coefficient with respect to the initial value.

A description will be given here by referring back to FIG. 3. The FFT processing unit 212 monitors the power value of the BB signal measured by the electrical power measuring unit 207 and, if the power value of the BB signal is equal to or greater than the threshold (for example, the threshold illustrated in FIG. 4), acquires the frequency spectra of the FB signal at the measurement time of the predetermined number of measurements. The fast Fourier transformation is used to acquire the frequency spectra of the FB signal. Then, the FFT processing unit 212 outputs the frequency spectra of the FB signal acquired at the measurement time of the predetermined number of measurements to the memory 213.

The memory 213 stores the frequency spectra of the FB signal acquired by the FFT processing unit 212 for each measurement time.

The bandwidth variation amount calculating unit 214 averages the frequency spectra of the FB signal stored in the memory 213, i.e., the frequency spectra of the FB signal acquired by the FFT processing unit 212 at the measurement time of the predetermined number of measurements. Then, the bandwidth variation amount calculating unit 214 calculates, by using the averaged frequency spectrum, an amount of variation in the bandwidth of the FB signal with respect to the initial value. At this point, the bandwidth variation amount calculating unit 214 may also change the initial value of the bandwidth in accordance with the "measurement temperature" received from the temperature measuring unit 210 and calculate an amount of variation in the bandwidth of the FB signal with respect to the changed initial value. The amount of variation in the bandwidth of the FB signal calculated by the bandwidth variation amount calculating unit 214 is output to the CPU 110.

Figure 8:
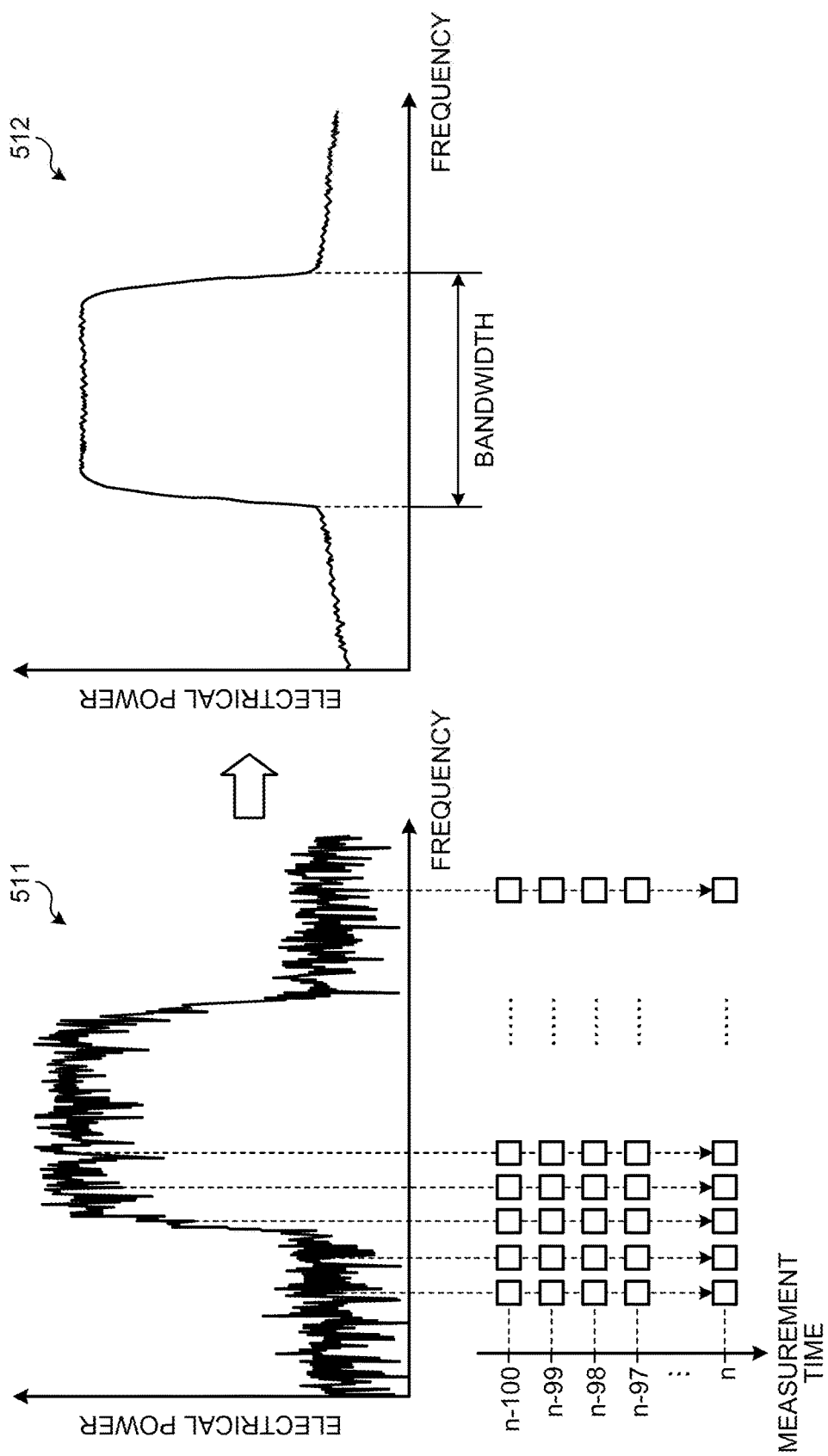
FIG. 8 is a schematic diagram illustrating an example of a calculation process of an amount of variation in the bandwidth of an FB signal.

In the following, a process performed by the bandwidth variation amount calculating unit 214 will be described with reference to FIG. 8. FIG. 8 is a schematic diagram illustrating an example of a calculation process of an amount of variation in the bandwidth of an FB signal. Furthermore, in FIG. 8, a waveform 511 indicates the frequency spectrum of the FB signal before the average and a waveform 512 indicates the frequency spectrum of the FB signal after the average.

For example, the bandwidth variation amount calculating unit 214 holds a second association table in which a measurement temperature is associated with the initial value of the bandwidth in accordance with each of the measurement temperatures and acquires, by using the second association table, the initial value of the bandwidth associated with the "measurement temperature" measured in the temperature measuring unit 210. The initial value of the bandwidth is a value that is previously determined when, for example, the RE device 100 is shipped from a plant or the like. Then, the bandwidth variation amount calculating unit 214 refers to the memory 213 and performs the moving average process on the frequency spectra of the FB signal acquired at the measurement time of the predetermined number of measurements, whereby the bandwidth variation amount calculating unit 214 averages the frequency spectra of the FB signal. In the example illustrated in FIG. 8, the moving average process is performed on the frequency spectra of the FB signal acquired at the measurement time of 100 measurements, whereby the frequency spectra of the FB signal are averaged. Then, the bandwidth variation amount calculating unit 214 measures, as illustrated on the right side illustrated in FIG. 8, by using the averaged frequency spectrum, the bandwidth of the FB signal. Then, the bandwidth variation amount calculating unit 214 calculates a difference between the initial value of the bandwidth acquired from the second association table and the bandwidth of the FB signal measured from the averaged frequency spectrum as the amount of variation in the bandwidth of the FB signal with respect to the initial value.

Figure 9:
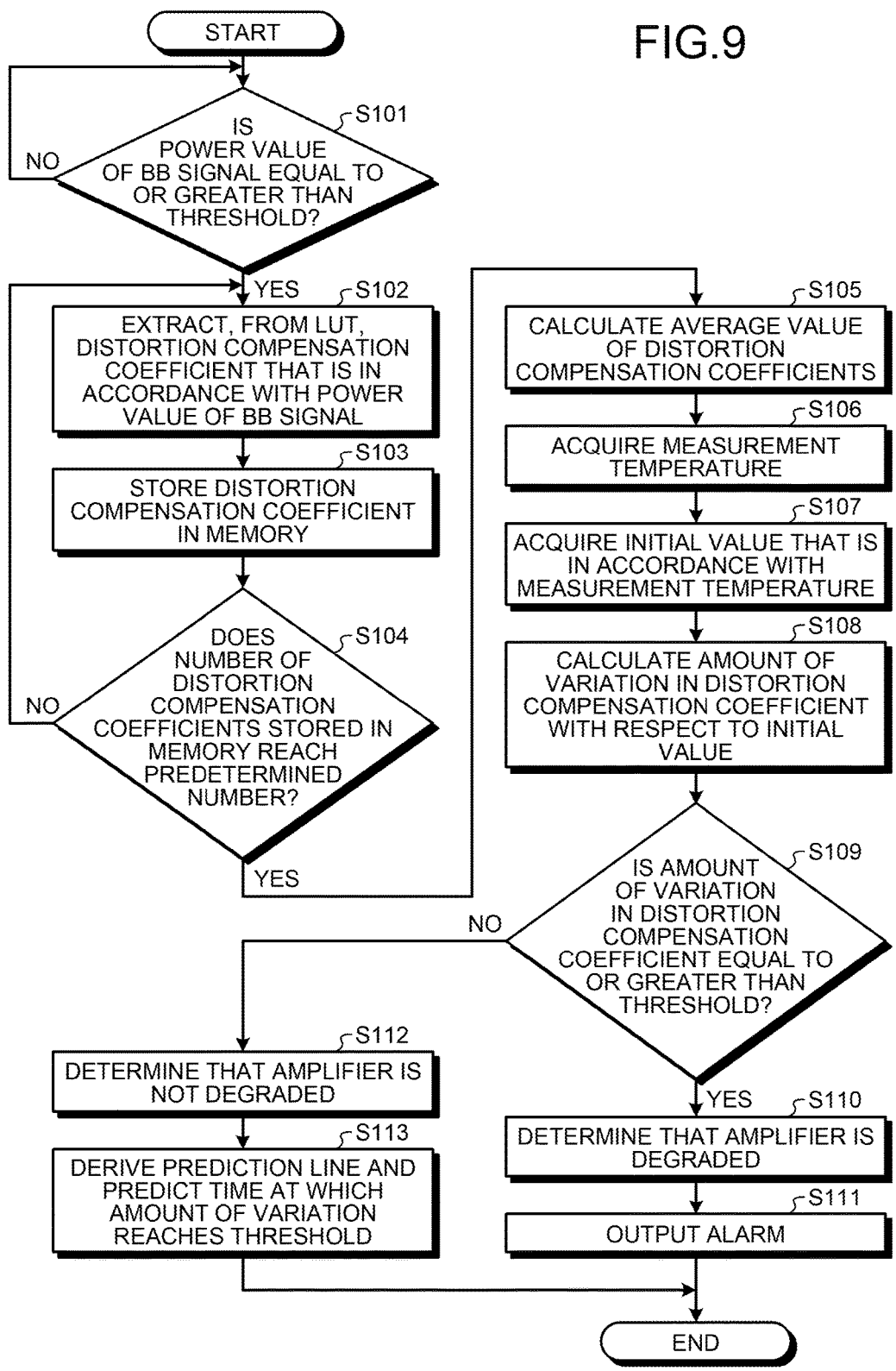
FIG. 9 is a flowchart illustrating an example of an amplifier deterioration determination process according to the embodiment.

In the following, an example of the amplifier deterioration determination process performed in the RE device 100 will be described with reference to the flowchart illustrated in FIG. 9 using a specific example. FIG. 9 is a flowchart illustrating an example of an amplifier deterioration determination process according to the embodiment.

When the BB signal sent from the REC device 10 is received by the RE device 100, the BB signal is subjected to distortion compensation by the multiplier 101, is subjected to DA conversion by the DA converter 102, and is up-converted by the modulator 104. Then, after the signal with the radio frequency obtained from up conversion is amplified by the PA 105, the signal is sent from the antenna and is fed back to the mixer 107. The fed back signal is down-converted by the mixer 107 and becomes the FB signal with the intermediate frequency and, then, the FB signal is output from the mixer 107 to the AD converter 108.

Then, the FB signal that has been subjected to AD conversion by the AD converter 108 is input to the FPGA 109. In contrast, the BB signal is also input to the FPGA 109 and the BB signal is made to delay by the delay device 202, whereby the phase of the BB signal matches with that of the FB signal. The BB signal and the FB signal are compared by the comparator 205 and the distortion compensation coefficients stored in the LUT 201 are updated by the computing unit 206 such that the difference between the BB signal and the FB signal approaches zero.

The coefficient extracting unit 208 monitors the power value of the BB signal measured by the electrical power measuring unit 207 and extracts, if the power value of the BB signal is equal to or greater than the threshold (Yes at Step S101), the distortion compensation coefficient that is in accordance with the power value of the BB signal from the LUT 201 (Step S102). The distortion compensation coefficient extracted from the LUT 201 by the coefficient extracting unit 208 is stored in the memory 209 (Step S103).

The coefficient variation amount calculating unit 211 refers to the memory 209 and determines whether the number of distortion compensation coefficients stored in the memory 209 reaches a predetermined number (Step S104). As the predetermined number, for example, 100 is set. If the number of distortion compensation coefficients stored in the memory 209 does not reach the predetermined number, i.e., if extraction of the distortion compensation coefficients from the LUT 201 at the measurement time of the predetermined number of measurements has not been completed (No at Step S104), the coefficient variation amount calculating unit 211 returns the process to Step S102.

In contrast, if the number of distortion compensation coefficients stored in the memory 209 reaches the predetermined number, i.e., if extraction of the distortion compensation coefficients from the LUT 201 at the measurement time of the predetermined number of measurements has been completed (Yes at Step S104), the coefficient variation amount calculating unit 211 proceeds the process to Step S105.

The coefficient variation amount calculating unit 211 calculates the distortion compensation coefficients stored in the memory 209, i.e., the average value of the distortion compensation coefficients extracted from the LUT 201 at the measurement time of the predetermined number of measurements (Step S105).

The coefficient variation amount calculating unit 211 acquires the measurement temperature that was acquired by the temperature measuring unit 210 (Step S106). Then, the coefficient variation amount calculating unit 211 acquires, by using the first association table, the initial value of the distortion compensation coefficient that is in accordance with the measurement temperature (Step S107).

The coefficient variation amount calculating unit 211 calculates, as the amount of variation in the distortion compensation coefficient with respect to the initial value, the difference between the initial value of the distortion compensation coefficient acquired from the first association table and the average value of the distortion compensation coefficients calculated at Step S105 (Step S108). The amount of variation in the distortion compensation coefficient calculated by the coefficient variation amount calculating unit 211 is output to the CPU 110.

If the amount of variation in the distortion compensation coefficient is equal to or greater than the threshold (Yes at Step S109), the CPU 110 determines that the PA 105 is degraded (Step S110) and outputs an alarm indicating the subject status (Step S111).

In contrast, if the amount of variation in the distortion compensation coefficient is less than the threshold (No at Step S109), the CPU 110 determines that the PA 105 is degraded (Step S112). At this time, the information related to the determination result indicating whether the PA 105 is degraded may also be created by the CPU 110 and the created information may also be reported to the monitoring device 30 via the REC device 10. Then, the CPU 110 derives a prediction line of the amount of variation on the basis of the amount of variation in the distortion compensation coefficient and notifies the monitoring device 30 of the information on the remaining time before the amount of variation in the distortion compensation coefficient reaches the threshold (Step S113). Namely, the CPU 110 functions as a predicting unit that predicts, by using the prediction line, the time at which the amount of variation reaches the predetermined threshold.

Figure 10:
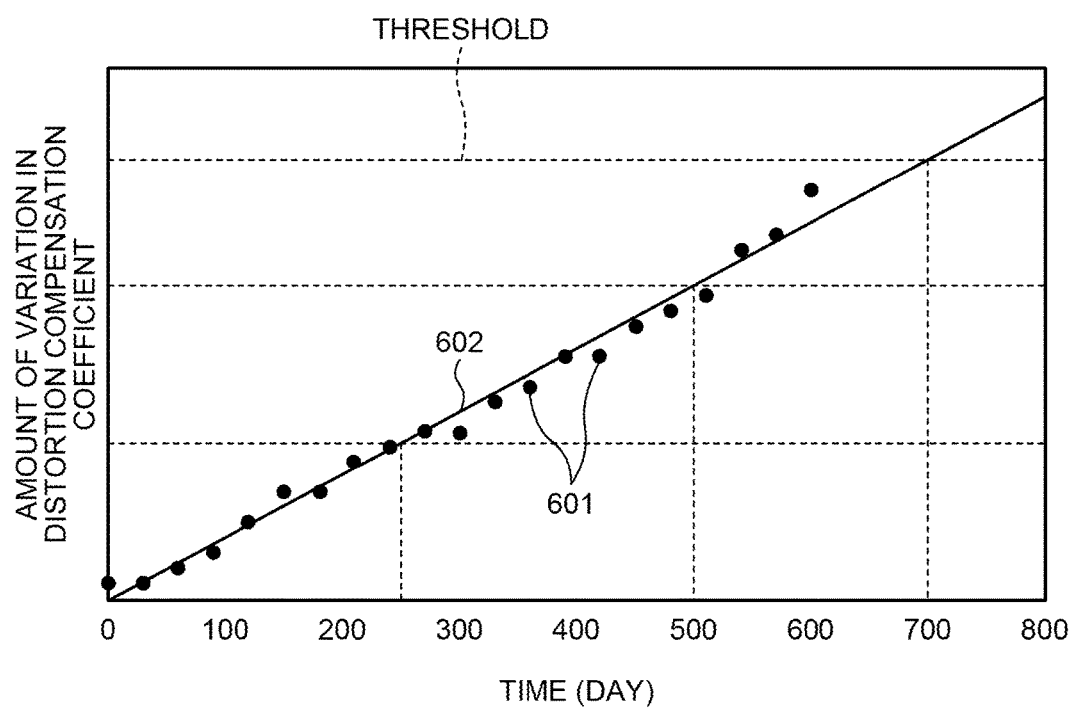
FIG. 10 is a schematic diagram illustrating a specific example of a prediction line of an amount of variation in the distortion compensation coefficients.

FIG. 10 is a schematic diagram illustrating a specific example of a prediction line of an amount of variation in the distortion compensation coefficients. Specifically, for example, as illustrated in FIG. 10, by using, for example, the least squares method by the CPU 110, a prediction line 602 of the amount of variation in the distortion compensation coefficients is derived from plots 601 that indicate the amount of variation in the distortion compensation coefficient for each measurement day. Then, the number of remaining days before the amount of variation in the distortion compensation coefficient for each measurement day reaches a predetermined threshold is acquired from the prediction line 602 by the CPU 110. In the example illustrated in FIG. 10, it is found that the prediction line 602 is derived by the plots 601 for 600 days and it is found that the number of remaining days before the amount of variation in the distortion compensation coefficient for each measurement day reaches the predetermined threshold is about 100 days. Furthermore, the CPU 110 may also output, in stages, an alarm in accordance with the subject amount of variation by using the derived prediction line before the amount of variation of the distortion compensation coefficient reaches the predetermined threshold.

Figure 11:
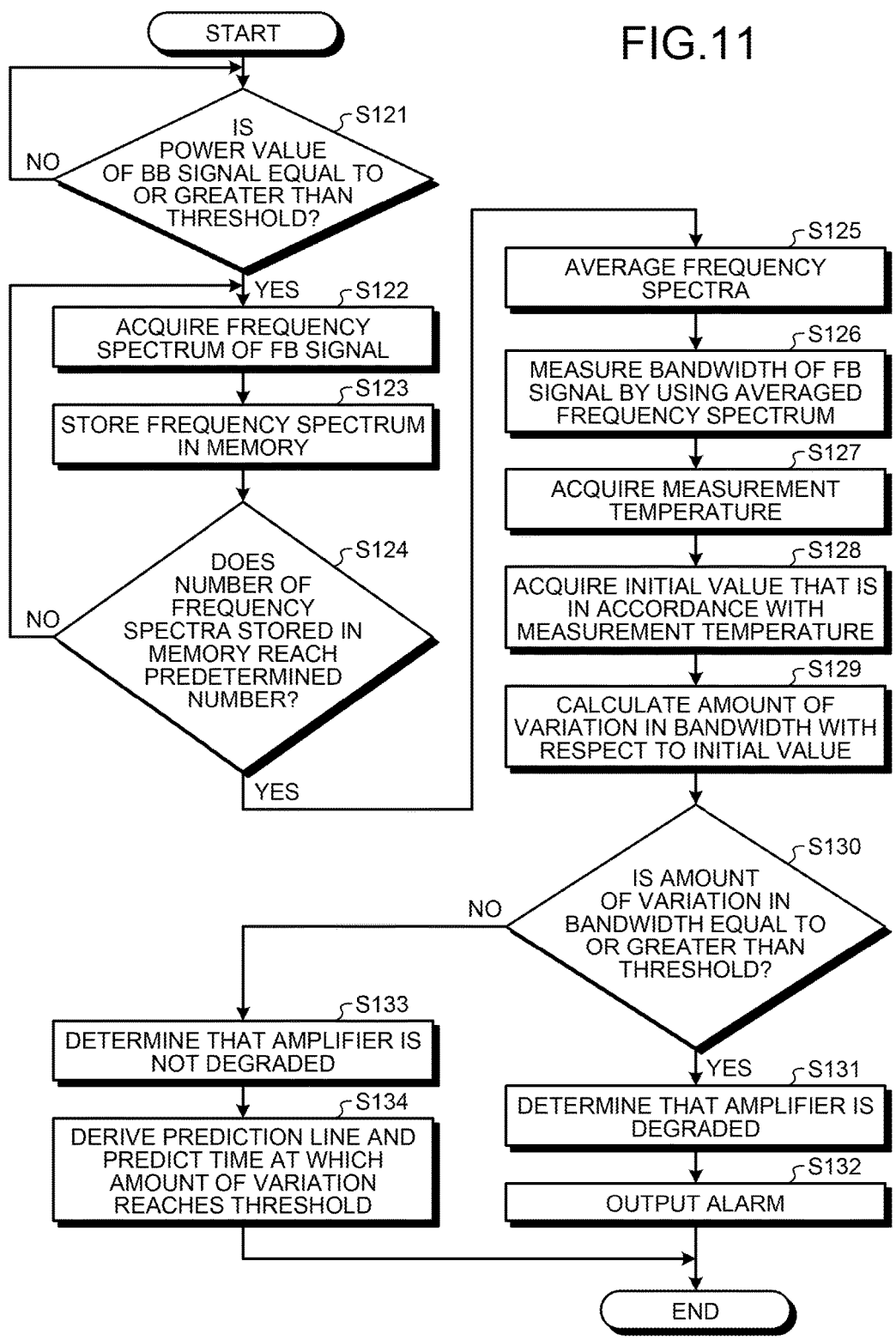
FIG. 11 is a flowchart illustrating another example of an amplifier deterioration determination process according to the embodiment.

In the following, another example of the amplifier deterioration determination process performed in the RE device 100 will be described with reference to the flowchart illustrated in FIG. 11 using a specific example. FIG. 11 is a flowchart illustrating another example of an amplifier deterioration determination process according to the embodiment. Furthermore, the process illustrated in FIG. 11 is performed in parallel with the process illustrated in FIG. 9.

The FFT processing unit 212 monitors the power value of the BB signal measured by the electrical power measuring unit 207 and, if the power value of the BB signal is equal to or greater than the threshold (Yes at Step S121), the FFT processing unit 212 acquires the frequency spectrum of the FB signal (Step S122). The frequency spectrum of the FB signal acquired by the FFT processing unit 212 is stored in the memory 213 (Step S123).

The bandwidth variation amount calculating unit 214 refers to the memory 213 and determines whether the number of frequency spectra stored in the memory 213 reaches a predetermined number (Step S124). As the predetermined number, for example, 100 is set. If the number of frequency spectra stored in the memory 213 does not reach the predetermined number, i.e., acquisition of the frequency spectra of the FB signal at the measurement time of the predetermined number of measurements has not been completed (No at Step S124), the bandwidth variation amount calculating unit 214 returns the process to Step S122.

In contrast, if the number of frequency spectra stored in the memory 213 reaches the predetermined number, i.e., acquisition of the frequency spectra of the FB signal at the measurement time of the predetermined number of measurements has been completed (Yes at Step S124), the bandwidth variation amount calculating unit 214 proceeds the process to Step S125.

The bandwidth variation amount calculating unit 214 averages the frequency spectra of the FB signal stored in the memory 213, i.e., averages the frequency spectra of the FB signal acquired by the FFT processing unit 212 at the measurement time of the predetermined number of measurements (Step S125). Then, the bandwidth variation amount calculating unit 214 measures the bandwidth of the FB signal by using the averaged frequency spectrum (Step S126).

The bandwidth variation amount calculating unit 214 acquires the measurement temperature acquired by the temperature measuring unit 210 (Step S127). Then, the bandwidth variation amount calculating unit 214 acquires, by using the second association table, the initial value of the bandwidth that is in accordance with the measurement temperature (Step S128).

The bandwidth variation amount calculating unit 214 calculates the difference between the initial value of the bandwidth acquired from the second association table and the bandwidth of the FB signal measured at Step S126 as an amount of variation in the bandwidth of the FB signal with respect to the initial value (Step S129). The amount of variation in the bandwidth of the FB signal calculated by the bandwidth variation amount calculating unit 214 is output to the CPU 110.

If the amount of variation in the bandwidth of the FB signal is equal to or greater than the threshold (Yes at Step S130), the CPU 110 determines that the PA 105 is degraded (Step S131) and outputs an alarm indicating the subject state (Step S132).

In contrast, if the amount of variation in the bandwidth of the FB signal is less than the threshold (No at Step S130), the CPU 110 determines that the PA 105 is not degraded (Step S133). At this time, the information indicating whether the determined PA 105 is degraded may also be created by the CPU 110 and the created information may also be reported to the monitoring device 30 via the REC device 10. Then, the CPU 110 derives a prediction line of the amount of variation on the basis of the amount of variation in the bandwidth of the FB signal and notifies the monitoring device 30 of the information about the remaining time before the amount of variation in the bandwidth of the FB signal reaches the threshold (Step S134). Namely, the CPU 110 functions as a predicting unit that predicts, by using the prediction line, the time at which the amount of variation reaches the predetermined threshold.

Figure 12:
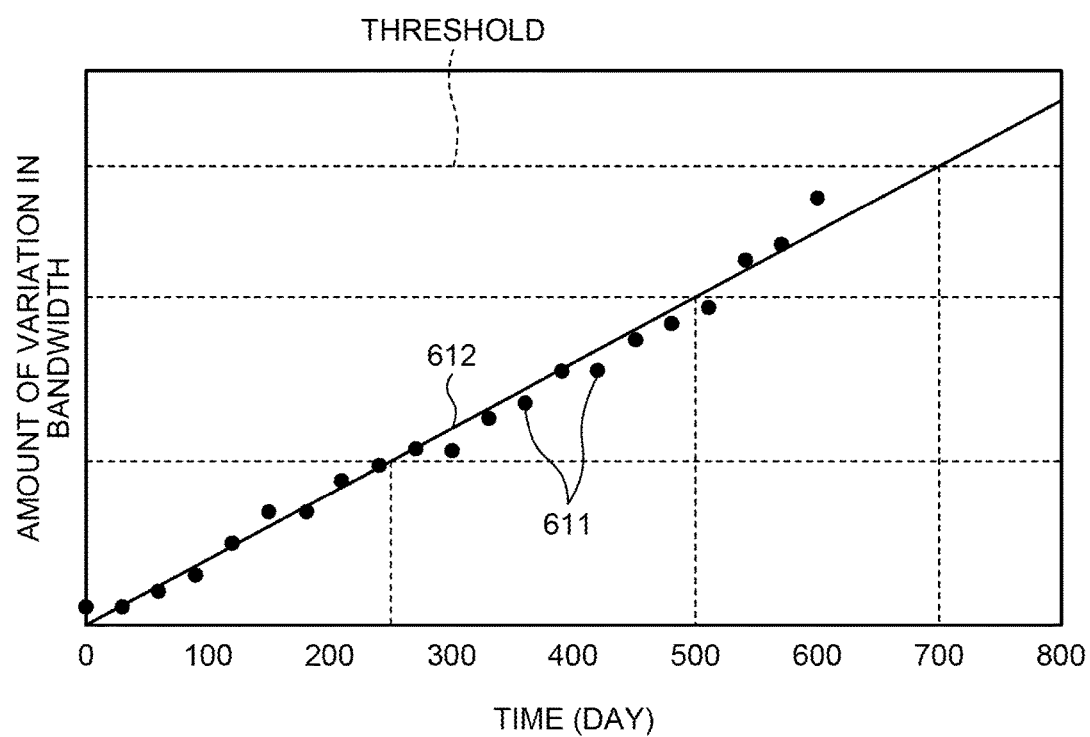
FIG. 12 is a schematic diagram illustrating a specific example of a prediction line of an amount of variation in the bandwidth of an FB signal.

FIG. 12 is a schematic diagram illustrating a specific example of a prediction line of an amount of variation in the bandwidth of an FB signal. Specifically, for example, as illustrated in FIG. 12, by using, for example, the least squares method by the CPU 110, a prediction line 612 of the amount of variation in the bandwidth of the FB signal is derived from plots 611 that indicate the amount of variation in the bandwidth of the FB signal for each measurement day. Then, the number of remaining days before the amount of variation in the bandwidth of the FB signal for each measurement day reaches a predetermined threshold is acquired from the prediction line 612 by the CPU 110. In the example illustrated in FIG. 12, it is found that the prediction line 612 is derived by the plots 611 for 600 days and it is found that the number of remaining days before the amount of variation in the bandwidth of the FB signal for each measurement day reaches the predetermined threshold is about 100 days.

Furthermore, the CPU 110 may also output, in stages, an alarm in accordance with the subject amount of variation by using the derived prediction line before the amount of variation in the bandwidth of the FB signal reaches the predetermined threshold.

As described above, according to the embodiment, when the power value of the BB signal is equal to or greater than the threshold, the distortion compensation coefficients that are in accordance with the power value of the BB signal are extracted from the LUT 201 at the predetermined number of measurement periods. Then, according to the embodiment, an amount of variation in the distortion compensation coefficient is calculated by using the average value of the extracted distortion compensation coefficients and it is determined, on the basis of the calculated amount of variation in the distortion compensation coefficient whether the PA 105 is degraded. Consequently, it is possible to extract the distortion compensation coefficient that is in accordance with the power value of the BB signal from the LUT 201 in the state in which the power value of the BB signal that is the signal before amplification in the PA 105 is present in the nonlinear operation area in the PA 105. Consequently, it is possible to appropriately determine degradation of the PA 105 (in particular, the degradation of the gain of the PA 105) by using the distortion compensation coefficient that is in accordance with the power value that satisfies the prescription of law.

Furthermore, according to the embodiment, when the power value of the BB signal is equal to or greater than the threshold, the frequency spectra of the FB signal are acquired at the predetermined number of measurements. Then, according to the embodiment, an amount of variation in the bandwidth of the FB signal is calculated by using the averaged frequency spectrum and it is determined, on the basis of the calculated amount of variation in the bandwidth of the FB signal, whether the PA 105 is degraded. Consequently, it is possible to acquire the frequency spectrum of the FB signal in the state in which the power value of the BB signal that is the signal before amplification in the PA 105 is present in the nonlinear operation area in the PA 105. Consequently, by using the frequency spectrum of the FB signal that is in accordance with the power value that satisfies the prescription of law, degradation of the PA 105 (in particular, the degradation of the occupied bandwidth of the signal output from the PA 105) can be appropriately determined.

Figure 13:
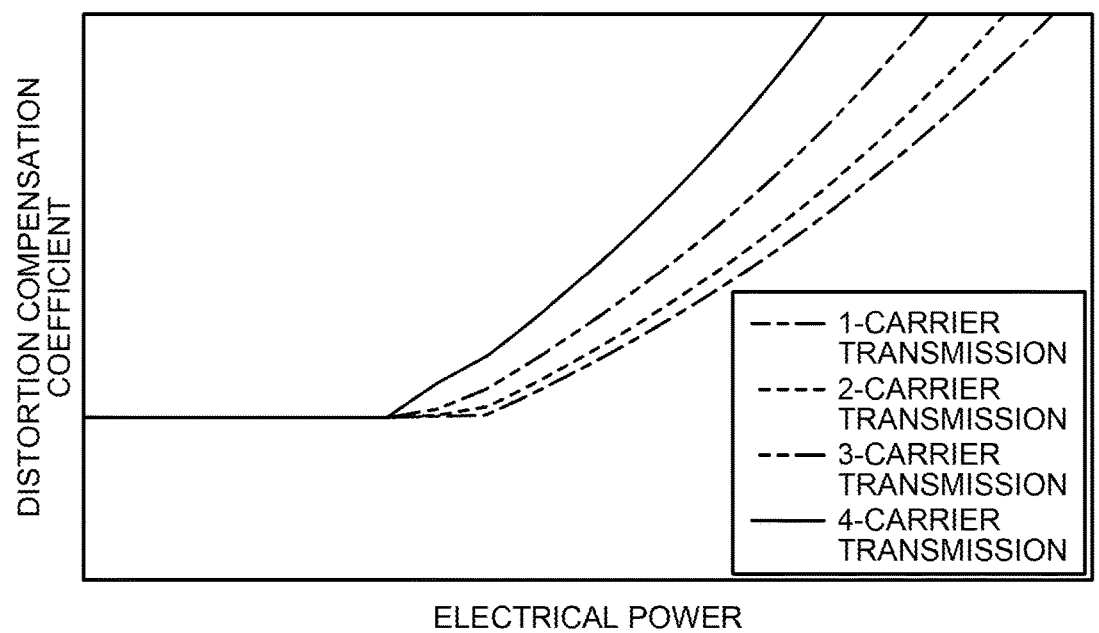
FIG. 13 is a schematic diagram illustrating variation of the distortion compensation coefficients in accordance with the number of carriers.

Furthermore, in the embodiment described above, the initial value of the distortion compensation coefficient is changed in accordance with the temperature of the RE device 100; however, the initial value of the distortion compensation coefficient may also be changed in accordance with the number of carriers that are used for radio transmission. If the number of carriers that are used for radio transmission is changed, it is known that a characteristic curve of a distortion compensation coefficient varies in accordance with, for example, as illustrated in FIG. 13, the number of carriers. FIG. 13 is a schematic diagram illustrating variation of the distortion compensation coefficients in accordance with the number of carriers. If the number of carriers is changed in this way, by using the CPU 110 or the monitoring device 30, the initial value of the distortion compensation coefficient may also be changed in accordance with the changed number of carriers. Furthermore, it is known that, if the number of carriers that are used for radio transmission is changed, the bandwidth of the FB signal is also changed in accordance with the number of carriers. Thus, if the number of carriers is changed, by using the CPU 110 or the monitoring device 30, the initial value of the bandwidth may also be changed in accordance with the number of carriers that has been changed.

According to an aspect of an embodiment of the wireless device disclosed in the present invention, an advantage is provided in that degradation of an amplifier can appropriately be determined.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless device comprising:
an amplifier that amplifies a signal that is wirelessly transmitted; and
a processor configured to:
compensate distortion in the amplifier by using a distortion compensation coefficient that is stored in a distortion compensation table and that is in accordance with a power value of the signal before amplification in the amplifier;
update, on the basis of an error between the signal before the amplification in the amplifier and an amplified signal after the amplification in the amplifier, the distortion compensation coefficient stored in the distortion compensation table;
extract, at a predetermined number of measurement periods, from the distortion compensation table when the power value of the signal before the amplification in the amplifier is equal to or greater than a threshold, the distortion compensation coefficient that is in accordance with the power value;
calculate, by using an average value of distortion compensation coefficients extracted at the predetermined number of measurement periods, an amount of variation in the distortion compensation coefficient with respect to an initial value of the distortion compensation coefficient; and
determine, on the basis of the calculated amount of variation in the distortion compensation coefficient, whether the amplifier is degraded.

2. The wireless device according to claim 1, wherein the processor is further configured to derive, on the basis of the calculated amount of variation in the distortion compensation coefficient, a prediction line of the amount of variation to predict, by using the derived prediction line, a time at which the amount of variation reaches a predetermined threshold.

3. The wireless device according to claim 2, wherein the processor is further configured to output, in stages by using the prediction line, an alarm in accordance with the amount of variation before the amount of variation in the distortion compensation coefficient reaches the predetermined threshold.

4. The wireless device according to claim 1, wherein the processor is further configured to:
measure a temperature of the wireless device; and
acquire the initial value of the distortion compensation coefficient that is in accordance with the measured temperature to calculate the amount of variation in the distortion compensation coefficient with respect to the acquired initial value.

5. The wireless device according to claim 1, wherein the processor is further configured to:
acquire, when the power value of the signal before the amplification in the amplifier is equal to or greater than the threshold, at a predetermined number of measurement periods, a frequency spectrum of the signal after the amplification in the amplifier;
average frequency spectra acquired at the predetermined number of measurement periods to calculate, by using a frequency spectrum obtained by the frequency spectra being averaged, an amount of variation in a bandwidth of the signal after amplification in the amplifier with respect to an initial value of the bandwidth; and
determine, on the basis of the calculated amount of variation in the bandwidth, whether the amplifier is degraded.

6. The wireless device according to claim 5, wherein the processor is further configured to derive, on the basis of the calculated amount of variation in the bandwidth, a prediction line of the amount of variation to predict, by using the derived prediction line, a time at which the amount of variation reaches a predetermined threshold.

7. The wireless device according to claim 6, wherein the processor is further configured to output, in stages by using the prediction line, an alarm in accordance with the amount of variation before the amount of variation in the bandwidth reaches the predetermined threshold.

8. The wireless device according to claim 5, wherein the processor is further configured to:
measure a temperature of the wireless device; and
acquire the initial value of the bandwidth that is in accordance with the measured temperature to calculate the amount of variation in the bandwidth with respect to the acquired initial value.

9. The wireless device according to claim 5, wherein the processor is further configured to change the initial value of the distortion compensation coefficient or the initial value of the bandwidth in accordance with number of carriers that are used for radio transmission.

* * * * *